(12) United States Patent
Ocheretny

(10) Patent No.: US 11,636,227 B2
(45) Date of Patent: Apr. 25, 2023

(54) PROTECTION AGAINST FAULT ATTACKS BY DUPLICATION

(71) Applicant: NXP B.V., Eindhoven (NL)

(72) Inventor: Vitaly Ocheretny, Hamburg (DE)

(73) Assignee: NXP B.V., Eindhoven (NL)

( * ) Notice: Subject to any disclaimer, the term of this patent is extended or adjusted under 35 U.S.C. 154(b) by 173 days.

(21) Appl. No.: 17/099,061

(22) Filed: Nov. 16, 2020

(65) Prior Publication Data
US 2022/0156410 A1    May 19, 2022

(51) Int. Cl.
*G06F 21/74* (2013.01)
*H03K 5/24* (2006.01)
*H03K 19/20* (2006.01)
*H03K 5/00* (2006.01)

(52) U.S. Cl.
CPC .............. *G06F 21/74* (2013.01); *H03K 5/24* (2013.01); *H03K 19/20* (2013.01); *H03K 2005/00078* (2013.01)

(58) Field of Classification Search
None
See application file for complete search history.

(56) References Cited

U.S. PATENT DOCUMENTS

| | | | |
|---|---|---|---|
| 7,134,104 B2 | 11/2006 | Goodnow et al. | |
| 8,412,988 B2 | 4/2013 | Bancel et al. | |
| 8,516,356 B2 | 8/2013 | Brewerton et al. | |
| 2003/0196140 A1* | 10/2003 | Kurosawa | G06F 11/27 714/E11.169 |
| 2013/0238945 A1* | 9/2013 | Vilela | G06F 11/1695 714/49 |
| 2020/0065486 A1 | 2/2020 | Zeh et al. | |
| 2020/0285719 A1 | 9/2020 | Wang et al. | |
| 2021/0191452 A1* | 6/2021 | Herberholz | G06F 21/71 |

OTHER PUBLICATIONS

Agoyan, Michael et al.; "Design and characterisation of an AES chip embedding countermeasures"; International Journal of Intelligent Engineering Informatics; Jan. 1, 2011; DOI: 10.1504/IJIEI.2011.044101.

Doulcier-Verdier, Marion et al.; "A side-Channel and Fault-Attack Resistant AES Circuit Working on Duplicated Complemented Values"; 2011 IEEE International Solid-State Circuits Conference; Feb. 20-24, 2011, San Francisco, California; DOI: 10.1109/ISSCC.2011.5746316.

(Continued)

*Primary Examiner* — Daniel C Puentes

(57) ABSTRACT

Various embodiments relate to a circuit system, including: an original circuit; a dual circuit, wherein the dual circuit is a dual of the original circuit; an input inverter connected the dual circuit, wherein the input inverter inverts system inputs; an output inverter connected to one of the original circuit and the dual circuit, wherein the output inverter inverts the output of the connected original circuit or dual circuit; and a comparator receiving and comparing the output of the invertor and the output of one of the original circuit and the dual circuit not connected to the inverter, wherein the comparator indicates an error when the received outputs are not identical and indicating no error when the received outputs are identical.

13 Claims, 4 Drawing Sheets

(56) References Cited

OTHER PUBLICATIONS

Dutertre, Jean-Max et al.; "Review of Fault Injection Mechanisms and Consequences on Countermeasure Design"; 2011 6th International Conference on Design & Technology of Integrated Systems in Nanoscale Era (DTIS); Apr. 6-8, 2011, Athens, Greece; DOI: 10.1109/DTIS.2011.5941421.

Dmitrieve at al., "New Self-dual Circuits for Error Detection and Testing" VLSI Design 2000, vol. 11, No. 1 pp. 1-21. (2000).

\* cited by examiner

PROTECTION AGAINST FAULT ATTACKS BY DUPLICATION

TECHNICAL FIELD

Various exemplary embodiments disclosed herein relate generally to systems and methods for improved protection against fault attacks in circuits by using duplication.

BACKGROUND

Duplication is well known approach to detect errors in digital circuits. It is widely used in safety devices to detect failures and in security devices to detect fault attacks. In the duplication approach, the original circuit is duplicated, the same inputs are applied to both original and duplicate circuits, and their outputs are compared for error detection. Optionally, inputs to the duplicate circuit may be delayed in comparison to the original circuit, and the comparison of the outputs is then also delayed. A big advantage of the duplication approach is that all errors in one of the circuits are detected. However, if the same error occurs in the original circuit as well as in the duplicate circuit, then the error cannot be not detected because both the circuits implement the same erroneous outputs. The probability of such an error is relatively low in the case of safety devices. It can be different for security devices because attackers can proactively try to exploit this known vulnerability of the duplication. The original circuit and the duplicate circuit are fully identical and will appear to be very similar in the layout. This fact may be used by attackers to identify locations to inject the same error in the original and duplicate circuits that then cannot be detected.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a circuit system, including: an original circuit; a dual circuit, wherein the dual circuit is a dual of the original circuit; an input inverter connected to the dual circuit, wherein the input inverter inverts system inputs; an output inverter connected to one of the original circuit and the dual circuit, wherein the output inverter inverts the output of the connected original circuit or dual circuit; and a comparator receiving and comparing the output of the invertor and the output of one of the original circuit and the dual circuit not connected to the inverter, wherein the comparator indicates an error when the received outputs are not identical and indicating no error when the received outputs are identical.

Various embodiments are described, further including an input delay element connected to the input of the original circuit; and an output delay element connected to the output of the dual circuit.

Various embodiments are described, further including an input delay element connected to the input of the dual circuit; and an output delay element connected to the output of the original circuit.

Various embodiments are described, wherein the original circuit is a combinatorial logic circuit with a plurality of logic gates and the dual circuit has a plurality of dual logic gates corresponding to the plurality logic gates in the original circuit.

Various embodiments are described, wherein the original circuit includes a first and second sub-circuit connected by a first register, the dual circuit includes a first and second dual sub-circuit connected by a second register, the first and second dual sub-circuits are duals of the first and second sub-circuit, the first and second registers receives a reset signal, and one of the first and second resisters uses flip-flops with asynchronous reset and the other register uses flip-flops with asynchronous set.

Various embodiments are described, wherein the output inverter is connected to the original circuit.

Various embodiments are described, wherein the output inverter is connected to the dual circuit.

Further various embodiments relate to a including: an original circuit; a dual circuit, wherein the dual circuit is a dual of the original circuit; an input inverter connected to the dual circuit, wherein the input inverter inverts system inputs; an output inverter connected to one of the original circuit and the dual circuit, wherein the output inverter inverts the output of the connected original circuit or dual circuit; and a comparator receiving and comparing the output of the invertor and the output of one of the original circuit and the dual circuit not connected to the inverter, wherein the comparator indicates an error when the received outputs are not identical and indicating no error when the received outputs are identical.

Various embodiments are described, further including an input delay element connected to the input of the original circuit; and an output delay element connected to the output of the dual circuit.

Various embodiments are described, further including an input delay element connected to the input of the dual circuit; and an output delay element connected to the output of the original circuit.

Various embodiments are described, wherein the secure system is one of a secure processor, secure memory, cryptographic system, and secure controller.

Various embodiments are described, wherein the original circuit is a combinatorial logic circuit with a plurality of logic gates and the dual circuit has a plurality of dual logic gates corresponding to the plurality logic gates in the original circuit.

Various embodiments are described, wherein the original circuit includes a first and second sub-circuit connected by a first register, the dual circuit includes a first and second dual sub-circuit connected by a second register, the first and second dual sub-circuits are duals of the first and second sub-circuit, the first and second registers receives a reset signal, and one of the first and second resisters uses flip-flops with asynchronous reset and the other register uses flip-flops with asynchronous set.

Various embodiments are described, wherein the output inverter is connected to the original circuit.

Various embodiments are described, wherein the output inverter is connected to the dual circuit.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments are described where the duplicate circuit is implemented in a different way than the original circuit to make detecting the location of the identical positions in the duplicate circuits more difficult. As a result it is more difficult for the attacker to inject faults into the same locations of the different circuits to create an undetectable error. For this purpose, the duplicate circuit may be implemented as a dual circuit, i.e., a circuit that produces inverted outputs if inverted inputs are applied to it. The dual circuit is not identical to the original circuit and will look different in the layout. In addition, injection of an error into the dual circuit must be done in an inverted way as compared to the original circuit. For example, if injecting an error into the original circuit, a signal must be changed from 0 to 1, then to inject an error into the dual circuit, the corresponding dual signal must be changed from 1 to 0.

Figure 1:
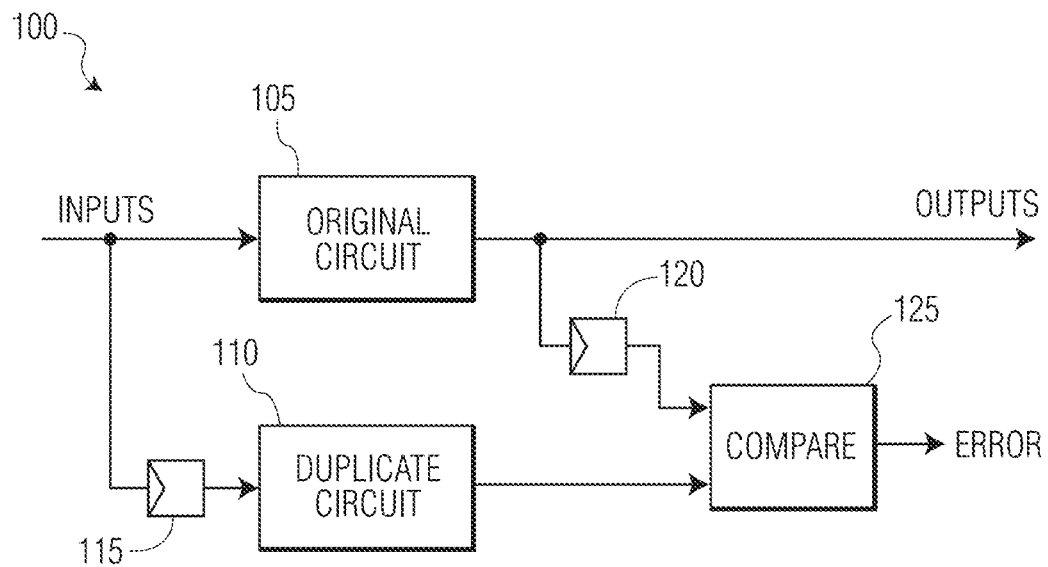
FIG. 1 illustrates the basic principle of error detection by duplication.

FIG. 1 illustrates the basic principle of error detection by duplication. The system 100 includes the original circuit 105 and a duplicate of the original circuit 110. The same inputs are applied to the original circuit 105 and the duplicate circuit 110. A comparator 125 compares the outputs of the original circuit 105 and the duplicate circuit 110. If the outputs do not match, the comparator 125 outputs a signal indicating an error, otherwise the output signal of the comparator 125 indicates no error.

In other embodiments, the system 100 may include delay circuits 115 and 120. The delay circuit 115 delays the input before it enters the duplicate circuit 110, hence the output of the duplicate circuit 110 is delayed. The delay circuit 120 delays the output of the original circuit 105 before it is input into the comparator 125. This allows the two signals input into the comparator 125 to be time aligned so that a proper comparison can be made between the outputs of the original circuit 105 and the duplicate circuit 110. Because the inputs propagate through the original circuit 105 and 110 at different times, it is harder for an attacker to coordinate the attack on specific portions of the circuits. It is also possible for the delay circuits 115, 120 to be located at the input to the original circuit 105 and the output of the duplicate circuit 110 instead, as this will have the same effect.

Figure 2:
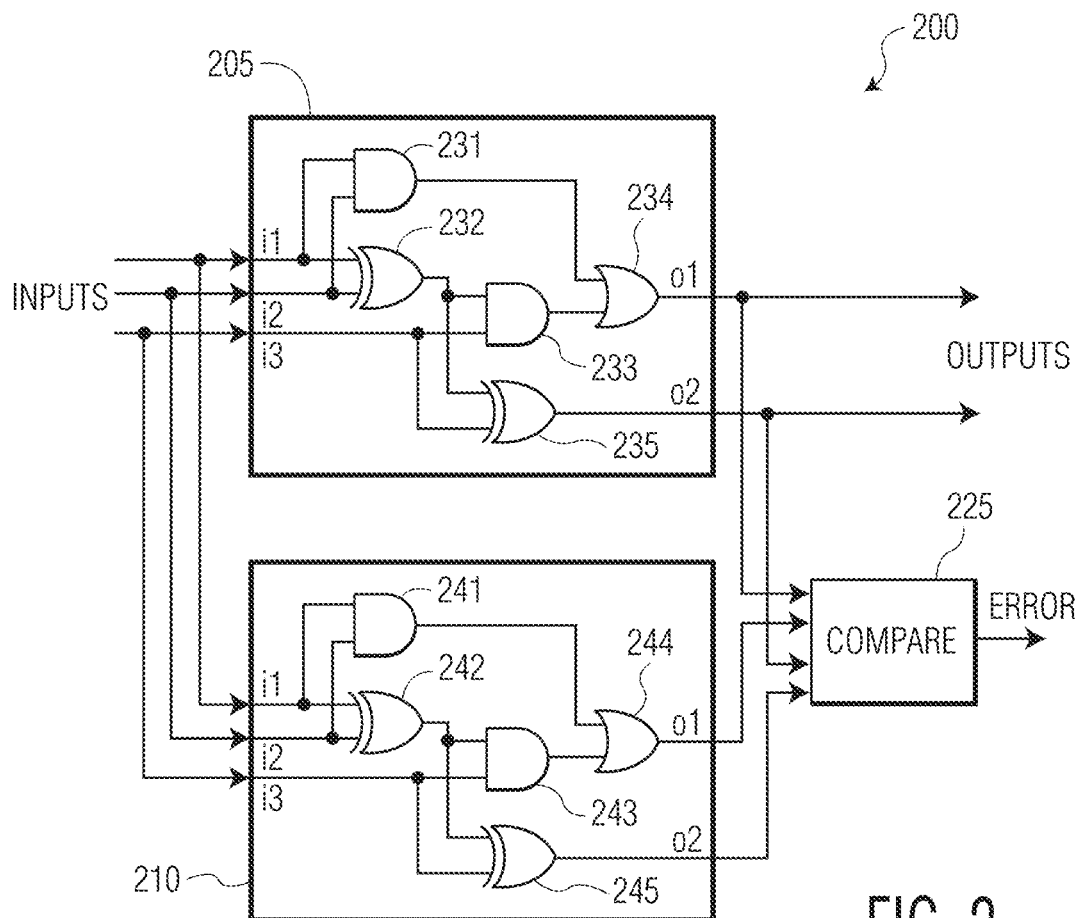
FIG. 2 provides a detailed diagram of system with a duplicate circuit with three inputs and two outputs.

FIG. 2 provides a detailed diagram of system with a duplicate circuit with three inputs and two outputs. The system 200 includes original circuit 205, duplicate circuit 210, and comparator 225. The original circuit 205 includes AND gate 231, XOR gate 232, AND gate 233, OR gate 234, and XOR gate 235 connected as shown. The original circuit 205 receives three inputs i1, i2, and i3 and produces two outputs o1 and o2. The duplicate circuit 210 is identical to the original circuit 205 and includes AND gate 241, XOR gate 242, AND gate 243, OR gate 244, and XOR gate 245 connected as shown. The comparator 225 receives the two outputs from the original circuit 205 and the two outputs from the duplicate circuit 210 and compares the first outputs o1 and the second outputs o2. The comparator will output an error signal if the two sets of outputs do not match, otherwise the comparator 225 outputs a signal indicating no error if the two sets of outputs do match.

In FIG. 2 if an attacker wants to attack the system 200 without detection an error needs to be injected into both circuits in the same place at the same time. In an example, the input is 101, and the correct output is 10. For example, if the output of the AND gate 233 is a 1 (when the input is 101) and instead the attacker forces an output of the gate 233 to be 0, the output will be 00. Then the comparator 225 in the original circuit 205 will indicate an error because the duplicate circuit 210 will output the correct and different output value of 10. If the attacker locates the AND gate 243 in the duplicate circuit 210, and then if the attacker forces the output of the AND gate 243 to 0 instead of 1, then the comparator 225 will not detect the error, because both the original circuit 205 and the duplicate circuit 210 will produce the same incorrect output of 10.

The duplication approach may detect all errors in one of the circuits. However, the same error in the original and duplicate circuits, as demonstrated in FIG. 2, cannot be detected. This is known vulnerability of the duplication approach. The attackers can try to exploit it, i.e., try to inject the same errors in both the circuits. To do this, they need to find corresponding positions in the original circuit 205 and the duplicate circuit 210. Because the original circuit 205 and the duplicate circuit 210 are fully identical to each other, the positions may be identified relatively easy by looking at layout of the original circuit 205 and duplicate circuit 210, because it may be assumed that the layouts of the circuits will be very similar.

Figure 3A:
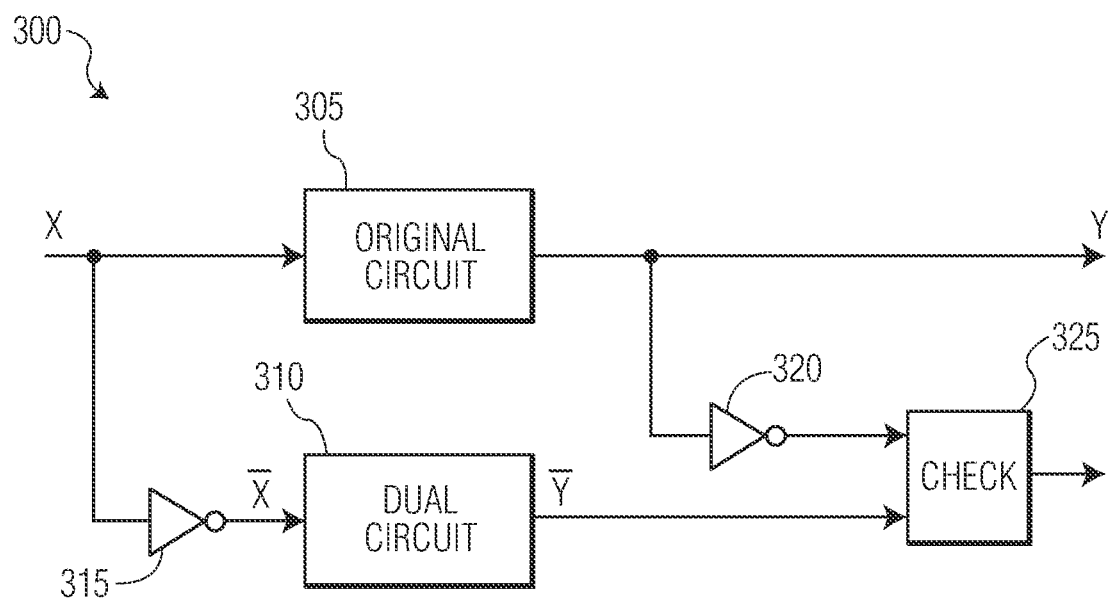
FIGS. 3A-3C illustrate illustrated three embodiments of a system that includes the original circuit and a dual of the original circuit.
Figure 3B:
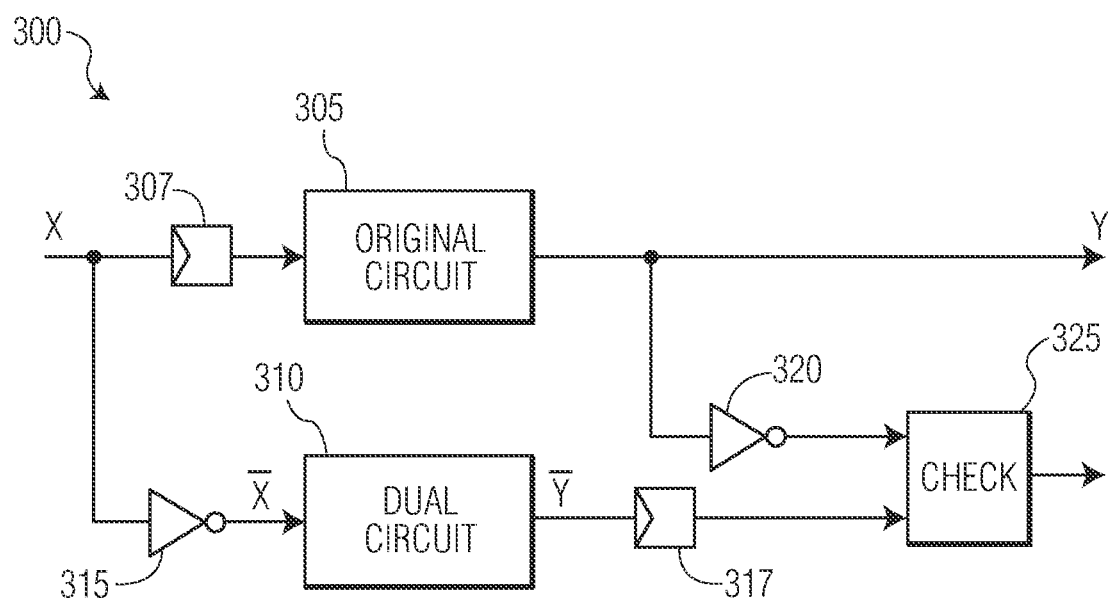
Figure 3C:
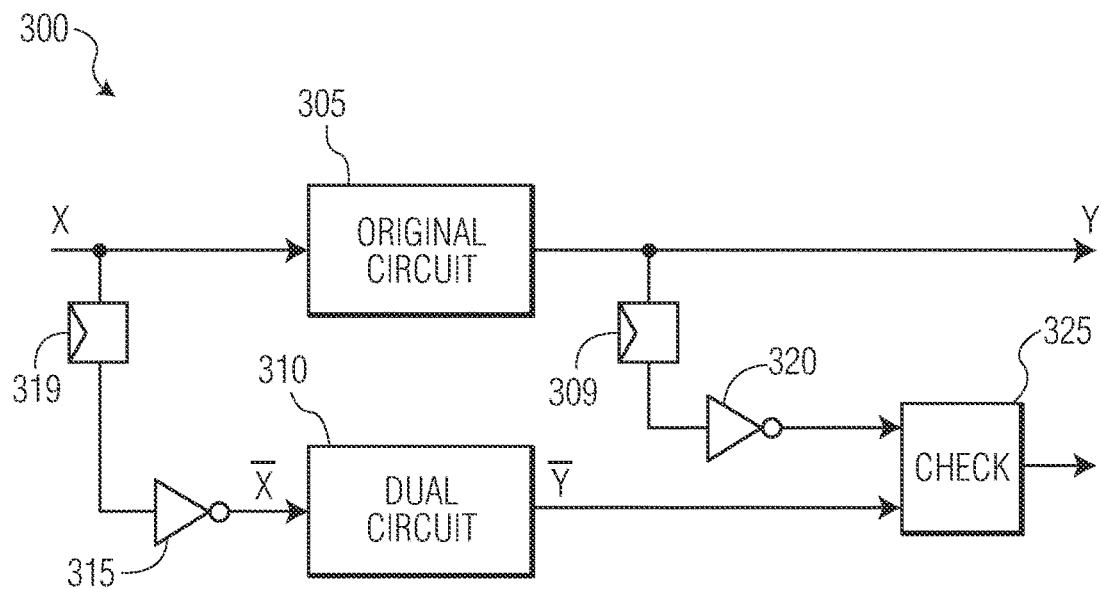

In order to obfuscate the location of the positions where the same errors may be injected, the duplicate circuit may be implemented in a different way from the original circuit. This may be done by having the duplicate circuit be the dual or the original circuit. FIG. 3A illustrates a system 300 that includes an original circuit 305 and a dual of the original circuit 305. The dual circuit 310 receives inverted inputs $\overline{X}$ (where X is input to the original circuit 305) and produces an inverted output $\overline{Y}$ (where Y is the output to the original circuit 305). The input X is inverted by the inverter 315. The output of the original circuit 305 is inverted by inverter 320. The comparator 325 then compares the inverted output from the inverter 320 and the output (which is also inverted) from the dual circuit 310. The inverter 320 may invert either the output of the original circuit 305 or the dual circuit 310 before the comparison. In either case either outputs Y or $\overline{Y}$ are being compared at the comparator 325. FIG. 3B illustrates a variation of the system of FIG. 3A by adding a delay circuit 307 at the input at the original circuit 305 and adding a delay circuit 317 at the output for the dual circuit 310. FIG. 3C illustrates a variation of the system of FIG. 3A by adding a delay circuit 319 at the input to the dual circuit 310 and adding a delay circuit 309 at the output of the original circuit 305. It is noted that the delay circuits and the inverters connected in series at the inputs and outputs of the original circuit 305 and dual circuit 310 may be connected in either order.

Figure 4:
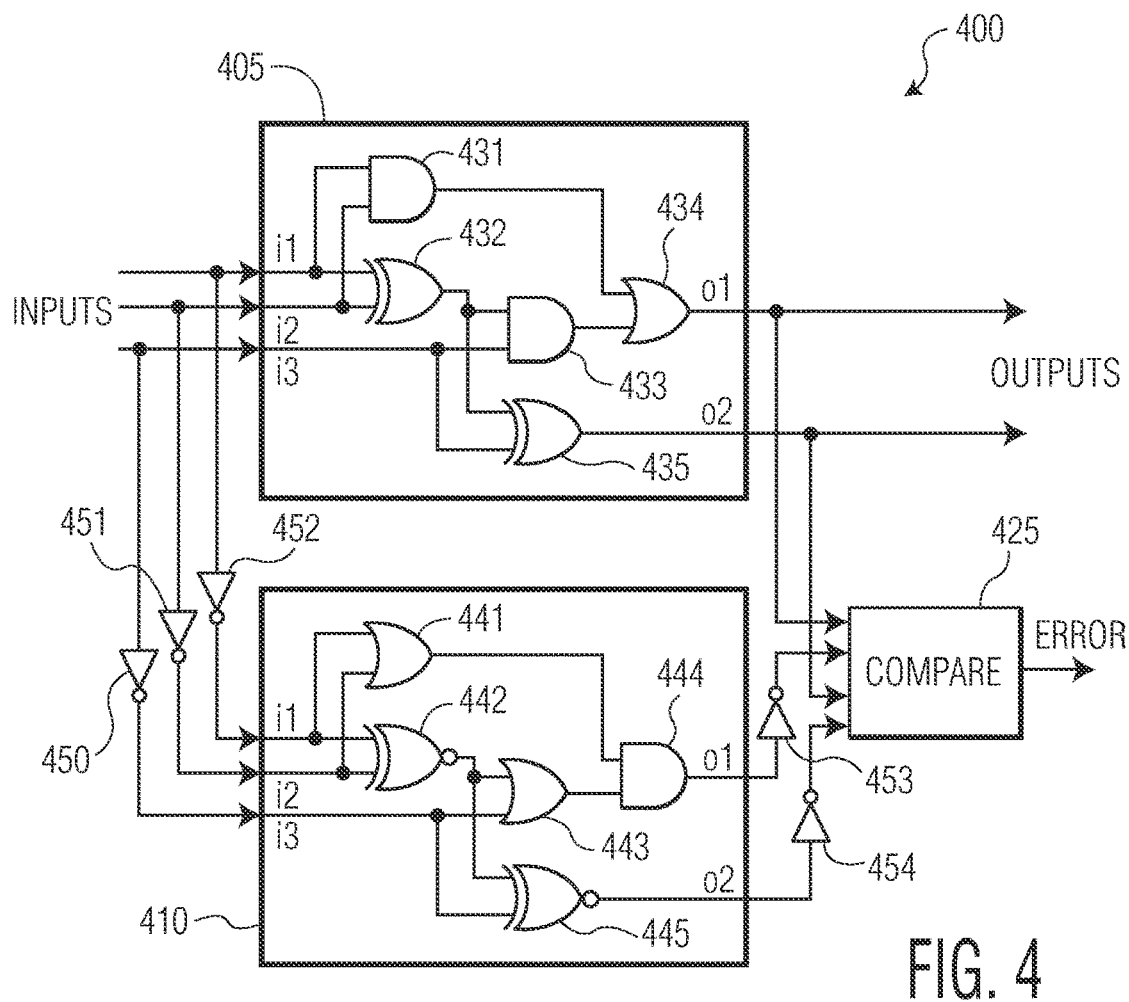
FIG. 4 illustrates a detailed circuit diagram of a system with an original circuit and its dual circuit with three inputs and two outputs.

FIG. 4 illustrates a detailed circuit diagram of a system with an original circuit 405 and its dual circuit 410 with three inputs and two outputs. The system 400 includes original circuit 405, dual circuit 410, inverters 450, 451, 452, 453, 454, and comparator 425. The original circuit 405 includes AND gate 431, XOR gate 432, AND gate 433, OR gate 434, and XOR gate 435 connected as shown. The original circuit 405 receives three inputs i1, i2, and i3 and produces two outputs o1 and o2. In order to generate the dual circuit, AND gates are replaced by OR gates, OR gates are replaced by AND gates, XOR gates are replaced by XNOR gates, XNOR gates are replaced by XOR gates, buffers are replaced by inverters, inverters are replaced by buffers, and any other type of original gates are replaced by their dual gates. Accordingly, the dual circuit 410 is obtained from the original circuit 405 by performing the following substitutions: AND gate 431 is replaced by OR gate 441; XOR gate 432 is replaced by XNOR gate 442; AND gate 433 is replace by OR gate 443; OR gate 434 is replaced by AND gate 444; and XOR gated 435 is replaced by XNOR gate 445.

The inverters 450, 451, 452 are shown as inverting the inputs i1, i2, i3 received by the dual circuit 410. The inverters 453, 454 invert outputs o1, o2 of the dual circuit. Likewise, the inverters 453, 454 may instead invert the outputs of the original circuit 405. The comparator 425 receives the two outputs from the original circuit 205 and the two inverted outputs from the duplicate circuit 210 and inverters 453, 454 and compares the outputs respectively. The comparator will output an error signal if the two sets of outputs do not match, otherwise the comparator 425 outputs a signal indicating no error if the two sets of out do match.

In FIG. 4 if an attacker wants to attack the system 400 without detection an error needs to be injected into both circuits in equivalent places at the same time. In an example, the input is 101 and the correct output is 10. For example, if the output of the AND gate 433 is a 1 and instead the attacker forces an output of the AND gate 433 to be 0, the output will be 00, and then the comparator 425 in the original circuit 405 will indicate an error because the dual circuit 410 will output 01 will be inverted to 10 which is different from the output of the original circuit 405.

Now if the attacker locates the dual OR gate 443 in the dual circuit 410, and then if the attacker forces the output of the OR gate 443 to 0, there is no change in the output because in the dual circuit 410 the output of the OR gate 443 is already 0. Accordingly, the comparator 425 will detect the error, because the output of the original circuit 405 and the inverted output of the dual circuit 410 will be different.

In order for the attacker to cause an undetectable error, they would need to identify the dual element in the dual circuit and know to invert the error value (e.g., a 0→1 change in the original circuit would become a 1→0 change in the dual circuit) from the original circuit. As the dual circuit would have a different layout, optically or visually identifying the dual circuit elements will become difficult for an attacker. Thus, identifying the dual circuit element and inverting the forced error becomes difficult for an attacker and provides improved resistance to attacks.

Figure 5:
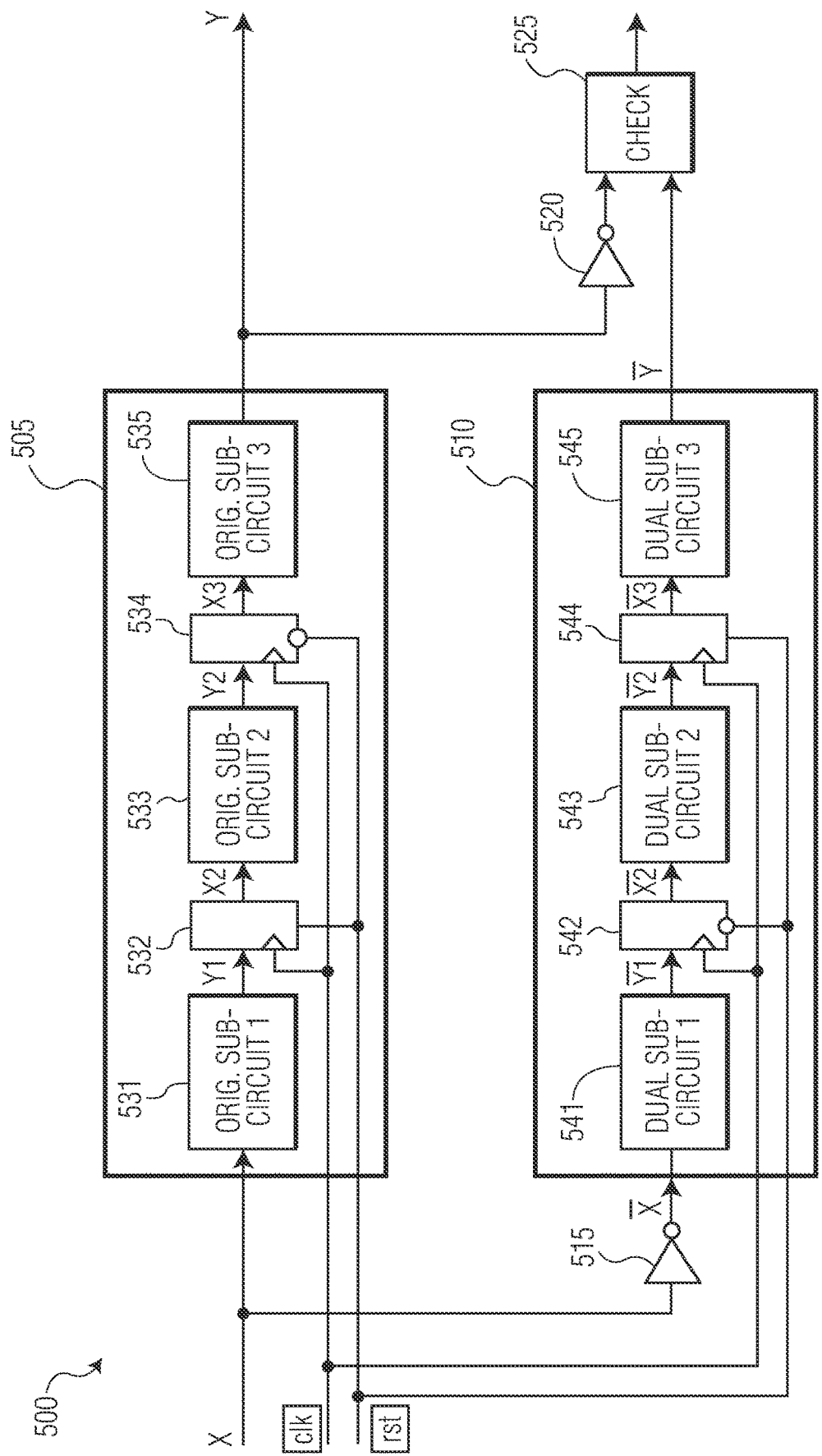
FIG. 5 illustrates an example where the original circuit includes sequential logic (i.e., registers).

The circuits in the above examples contain only combinatorial logic. FIG. 5 illustrates an example where the original circuit includes sequential logic (i.e., registers). The system 500 in FIG. 5 is similar to the system of FIG. 3, but instead the original circuit 505 includes sub-circuits 531, 533, 535, which are implemented as combinatorial logic, and register stages 532, 534 between the sub-circuits. The dual circuit 510 is derived from the original circuit 505 as follows: gates in the combinatorial sub-circuits 531, 533, 535 of the original circuit 505 are replaced by their dual gates as previously described, i.e., AND gates by OR gates, XOR gates by XNOR gates etc.; and registers 532, 542 of the original circuit are replaced by registers 542, 544 which have inverted reset inputs (that is flip-flops with asynchronous reset are replaced by flip-flops with asynchronous set, and vice versa), so that after reset they will contain inverted values in comparison to the values in the registers in the original circuit.

As previously discussed, delays may also be used to further make it difficult for the attacker effectively attack the operation of the original circuit without detection. Accordingly, variations of the systems are possible regarding the location of the invertors and the delay elements (if used) in order to implement the detection of errors in the original circuit. The use of the dual architecture obscures the architecture of the dual circuit as compared to the original circuit. This makes it harder for an attacker to identify the dual circuit as corresponding to the original circuit and to determine the location of the dual circuit elements corresponding to elements in the original circuit. Further, the fact that the logic is inverted in the dual circuit is another factor that the attacker would have to comprehend and then counter. Accordingly, the embodiments described herein improve the security of the system in resisting attacks.

The embodiments described herein may be implemented in various types of secure circuits including, for example, processors, storage, controllers, cryptographic systems, etc. Further, these embodiments may be implemented in various types of safety devices including, for example, automotive devices, medical devices, etc. The embodiments described herein will improve the ability of secure systems to resist hardware attacks by attackers.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A circuit system, comprising:
an original circuit configured to produce an output in response to an input, wherein the original circuit includes first and second sub-circuits connected by a first register;
a dual circuit, wherein the dual circuit is a dual of the original circuit such that when the dual circuit receives an inverted input the dual circuit produces an inverted output that is the inverse of the output of the original circuit when it receives the input, wherein the dual circuit includes first and second dual sub-circuits connected by a second register, the first and second dual sub-circuits are duals of the first and second sub-circuits, and wherein the first and second registers receive a reset signal, and one of the first and second resisters uses flip-flops with asynchronous reset and the other register uses flip-flops with asynchronous set;

an input inverter connected to the dual circuit, wherein the input inverter inverts system inputs;

an output inverter connected to one of the original circuit and the dual circuit, wherein the output inverter inverts the output of the connected original circuit or dual circuit; and a comparator receiving and comparing the output of the output inverter and the output of one of the original circuit and the dual circuit not connected to the output inverter, wherein the comparator indicates an error when the received outputs are not identical and indicating no error when the received outputs are identical.

2. The system of claim 1, further comprising:
an input delay element connected to the input of the original circuit; and
an output delay element connected to the output of the dual circuit.

3. The system of claim 1, further comprising:
an input delay element connected to the input of the dual circuit; and
an output delay element connected to the output of the original circuit.

4. The system of claim 1, wherein the original circuit is a combinatorial logic circuit with a plurality of logic gates and the dual circuit has a plurality of dual logic gates corresponding to the plurality logic gates in the original circuit.

5. The system of claim 1, wherein the output inverter is connected to the original circuit.

6. The system of claim 1, wherein the output inverter is connected to the dual circuit.

7. A secure system, comprising:
an original circuit configured to produce an output in response to an input, wherein the original circuit includes first and second sub-circuits connected by a first register;
a dual circuit, wherein the dual circuit is a dual of the original circuit such that when the dual circuit receives an inverted input the dual circuit produces an inverted output that is the inverse of the output of the original circuit when it receives the input, wherein the dual circuit includes first and second dual sub-circuits connected by a second register, the first and second dual sub-circuits are duals of the first and second sub-circuits, and wherein the first and second registers receive a reset signal, and one of the first and second resisters uses flip-flops with asynchronous reset and the other register uses flip-flops with asynchronous set;

an input inverter connected to the dual circuit, wherein the input inverter inverts system inputs;

an output inverter connected to one of the original circuit and the dual circuit, wherein the output inverter inverts the output of the connected original circuit or dual circuit; and a comparator receiving and comparing the output of the output inverter and the output of one of the original circuit and the dual circuit not connected to the output inverter, wherein the comparator indicates an error when the received outputs are not identical and indicating no error when the received outputs are identical.

8. The secure system of claim 7, further comprising:
an input delay element connected to the input of the original circuit; and
an output delay element connected to the output of the dual circuit.

9. The secure system of claim 7, further comprising:
an input delay element connected to the input of the dual circuit; and
an output delay element connected to the output of the original circuit.

10. The secure system of claim 7, wherein the secure system is one of a secure processor, secure memory, cryptographic system, and secure controller.

11. The secure system of claim 7, wherein the original circuit is a combinatorial logic circuit with a plurality of logic gates and the dual circuit has a plurality of dual logic gates corresponding to the plurality logic gates in the original circuit.

12. The secure system of claim 7, wherein the output inverter is connected to the original circuit.

13. The secure system of claim 7, wherein the output inverter is connected to the dual circuit.

* * * * *